May 1, 1956     E. N. SHAWHAN ET AL     2,744,232
MAGNETIC AND CONDUCTING MATERIALS DETECTOR
Filed March 6, 1952     6 Sheets-Sheet 1

FIG. 1.

VOLTAGE ON ELEMENTS OF TUBE 92 vs. TIME

INVENTORS.
E. N. SHAWHAN
J. BROWN
M. J. RELIS
BY
ATTYS.

FIG. 7.

INVENTORS.
E. N. SHAWHAN
J. BROWN
M. J. RELIS
ATTYS.

May 1, 1956   E. N. SHAWHAN ET AL   2,744,232
MAGNETIC AND CONDUCTING MATERIALS DETECTOR
Filed March 6, 1952   6 Sheets-Sheet 5

INVENTORS.
E. N. SHAWHAN
BY   J. BROWN
M. J. RELIS
ATTYS.

United States Patent Office 2,744,232
Patented May 1, 1956

2,744,232

MAGNETIC AND CONDUCTING MATERIALS DETECTOR

Elbert N. Shawhan, Newtown Square, Pa., Matthew J. Relis, Bayside, N. Y., and John Brown, College Park, Md.

Application March 6, 1952, Serial No. 275,210

17 Claims. (Cl. 324—3)

(Granted under Title 35, U. S. Code (1952), sec. 266)

This invention relates generally to the art of electronic detectors for detecting and locating ferrous and non-ferrous metallic bodies. While the invention is of general utility, it is particularly suitable for use in a system for indicating the presence and location of a hidden mass of metallic material of such nature as to have a different effect on the system than does the surrounding substance such, for example, as for detecting and locating metal objects submerged in sea water or buried a slight distance beneath the surface of the earth.

It is frequently desirable to provide an initially balanced electrical system sensitive to unbalance and which, upon the occurrence of an unbalanced condition, provides a desired indication in response to some change of conditions causing the unbalance. Reactance components and resistance components are generally employed in systems of this nature and, in certain systems of this type, a change of either one of such components produces an unbalance of the system. In certain cases, the unbalance of only one type of component is of interest, the other component being ignored. Where only one of the components is of importance, it has been found desirable to provide an indicating system which is phase selective whereby the system produces the desired indication only in response to an unbalance of the component of interest. In such systems an automatic rebalancing arrangement is provided to compensate any unbalance of the component which is not of interest without affecting any unbalance of the relevant component. The present invention is of the type of detector system in which one component only is of interest, the contribution of remaining components being negligible or eliminated by cancellation thereof.

The device of the instant invention employs a magnetic detection system and is particularly adapted for use as a portable mine detector and locator in beach defense reconnaissance. Under the conditions of such service it has been found that in locating and clearing mines from beaches and the shallow water adjacent thereto a demolition team just prior to invasions must swim into the beaches at night from ships located a substantial distance from shore such, for example, as two miles. Consequently, a reliable detector of rugged construction unaffected by long periods of submersion is needed and has been provided by the present invention.

Briefly stated, a locally produced sinusoidal magnetic field is disturbed by the presence of an object composed of magnetic or conducting materials, as the case may be. The disturbance is detected by a pickup coil, converted to electrical current thereby, and is amplified to a suitable voltage to actuate any convenient indicating instrument such, for example, as earphones, visual indicators or a tape recorder. Phase discriminating apparatus is provided for the purpose of distinguishing between objects composed of magnetic materials and those composed of other conducting materials. It will be readily apparent to those skilled in the art that the detector is also suitable for use on shipboard to detect and locate submarine mines, on land to detect and locate land mines, in shallow water to detect and locate mines which are buried in the sand or rocks, and that there are numerous other applications in which any part or all of the combination herein disclosed and claimed may be of general utility.

When the system of the instant invention is employed as a detector, the voltage developed across the pickup coil by the reflected field may be regarded as the vector sum of three voltages such, for example, as (1) a voltage developed by the lines of flux of the magnetic field of the hidden object passing through the pickup coil, (2) a voltage developed by the eddy currents in the salt water in the immediate vicinity thereof, and (3) a direct pickup voltage from the radiator coil. It will be readily understood that another voltage component may be developed across the pickup coil should another detector be operating in the vicinity.

The primary function of the instant invention is to indicate the level of voltage developed by eddy currents in the hidden object, this voltage being hereinafter referred to as the signal voltage, independently of the other voltage components developed across the pickup coil by means of a compensating arrangement as will more readily appear as the description proceeds. This signal voltage is amplified by apparatus described hereinafter. In addition to the foregoing and primary function, the instant invention is characterized as having a secondary function of utilizing the phase of the signal voltage, by means of phase discriminating apparatus, to produce an indication of the position of the hidden body and the type of metal, whether magnetic or conducting, of which it is composed.

In addition to the pickup coil, a field-producing or transmitting coil is provided and is energized at a frequency of a predetermined value such, for example, as a frequency within the range of 30 to 1000 cycles per second. The field of the transmitting or radiator coil induces a distribution of magnetic moments in any metallic object in the vicinity of this coil. These induced magnetic moments oscillate at the frequency of the current passing through the transmitting coil and in phase lagging relationship thereto.

The voltage from eddy currents in the sea water is approximately 90 degrees out of phase with the signal from an object composed of magnetic material and the signal from another object composed of conducting material when the field transmitted by the radiator coil has a frequency of 100 cycles per second.

Accordingly, one of the objects of the present invention is the provision of a new and improved apparatus for detecting and locating hidden obects composed of magnetic or conducting materials, as the case may be.

Another object is the provision of a portable detector and locator which can be used by one man on land or in the water as the situation demands.

An additional object of the instant invention resides in a novel and improved detector and locator apparatus whereby both conducting and magnetic materials can be separately detected, located and distinguished one from the other.

Another object of the present invention is the provision of a new and improved detector and locator which produces a pronounced difference in the signal tone received when a vertical plane through the probe handle passes over the object sought to be detected to thereby enable the operator to detect and locate the object more readily.

Another object of the present invention is the provision of a new and improved detector and locator which provides a visual indication when a vertical plane through the probe handle passes over the object sought permitting use of the detector and locator under water.

Another object of the present invention is the provision of a new and improved structure for a probe using an orthogonal coil system whereby flexure of the probe under the conditions of use is minimized thereby reducing signals due to noise caused by relative movement of one of the orthogonally arranged coils with respect to the other coil.

Other objects and many of the attendant advantages of this invention will be readily appreciated as the same becomes better understood by reference to the following detailed description when considered in connection with the accompanying drawings wherein.

Figure 1:
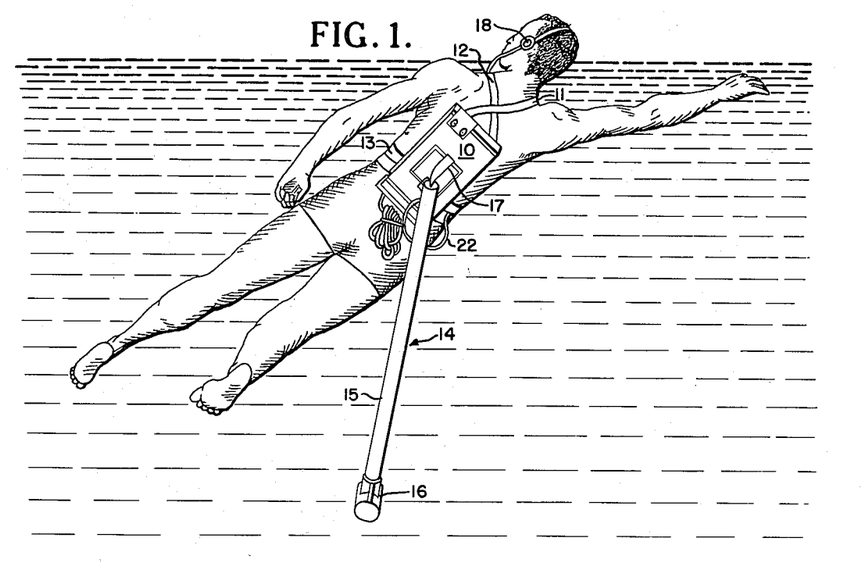
Fig. 1 is a view of the device as used to detect and locate metal objects submerged in water.
Figure 12:
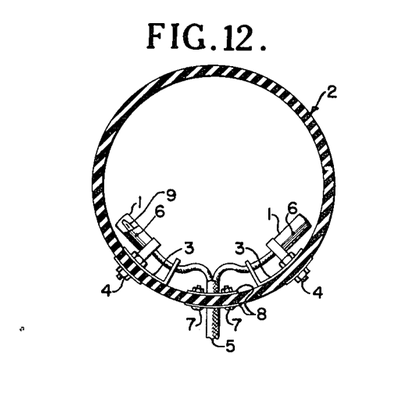
Fig. 12 is a view in section showing a visual form of signal indicating device arranged in a diver's mask for use under water.

Referring now to the accompanying drawings in which like reference numerals are employed to designate like parts, and more particularly to Fig. 1 thereof in which reference numeral 10 designates the back-pack within which the control box is carried and which may be strapped to the back of the operator in any convenient manner such, for example, as by straps 11, 12 and 13. The control box contains an alternating current amplifier, a direct current amplifier, a reset control apparatus and a power supply unit, each of these components being described in greater detail hereinafter. The probe, designated generally by the reference numeral 14, comprises the handle 15 and the head 16 which is integrally mounted to the handle and is perpendicular thereto. The probe 14, which may be detachably connected at one end thereof in any suitable manner to the control box back-pack 10 as by the strap 17 contains apparatus, more fully described hereinafter, which detects the presence of submerged or hidden metallic objects and sets the apparatus contained within the control box into operation to thereby inform the operator of the presence and location of such objects by means of any apparatus suitable for the purpose such, for example, as by the waterproof head phones 18, or, in the event the device is used under water by neon lights 9 mounted in small black metal housings 1 having apertures 6 to allow a small amount of light to fall on or near the operator's eye. The neon lights 9 are supported in a diver's mask 2 by a suitable bracket arrangement shown generally at 3, fastened to the mask by bolts 4. The neon lights 9 are connected to the back-pack 10 by means of a cable 5 which passes through a watertight joint at the base of the mask formed by drawing up on the bolts 7 which compresses the rubber material of the mask between the plates 8 and enters the back-pack 10 through a packing gland. The operator will see a glow in the mask on the side toward the mine or hidden object producing the signal. The diver's mask 2 can be used either with the headphones 18, or in place of them.

Figures 2, 3, 4, 5:
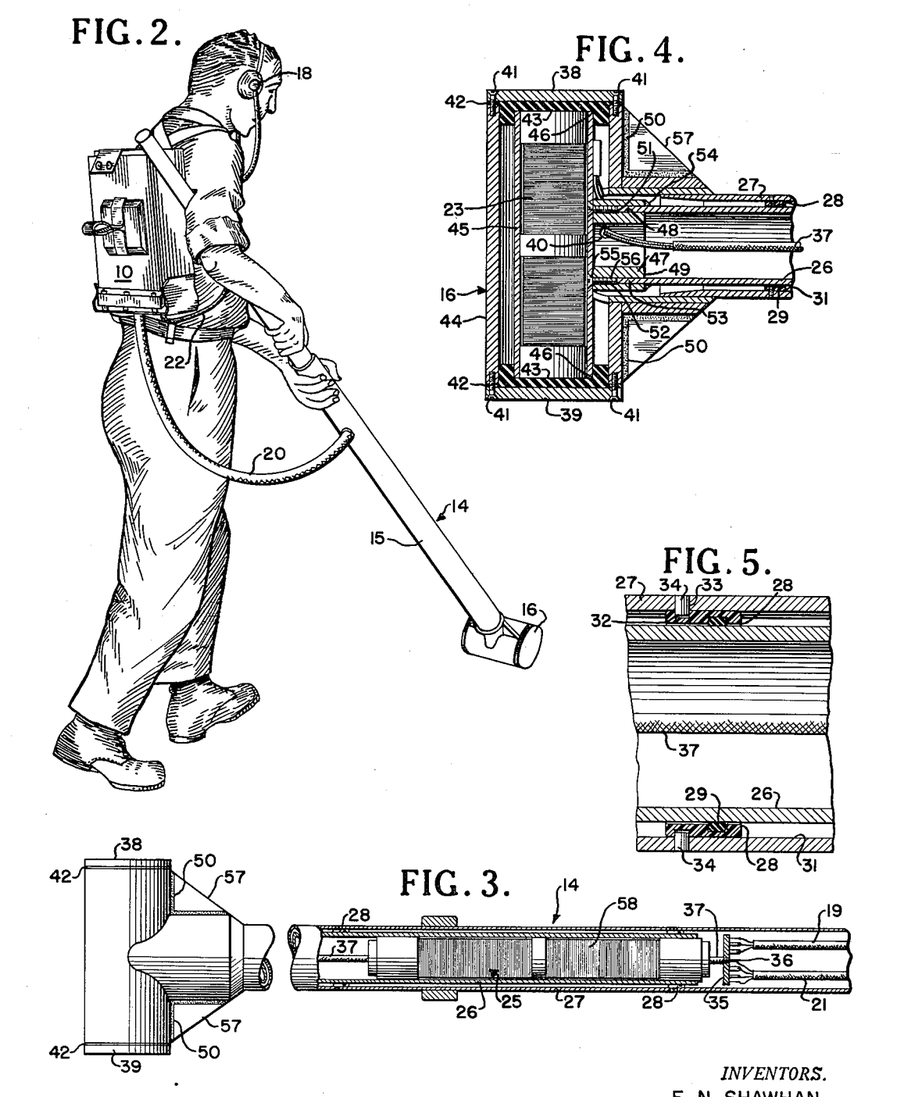
Fig. 2 is a view of the detector and locator as it may be used on land or in shallow water.
Fig. 3 is a view, partly in section, of a portion of the probe handle and shows the radiator coil disposed therein.
Fig. 4 is a cross-sectional view of the lower end of the probe illustrating the manner in which the pickup coil is mounted therein.
Fig. 5 is a magnified view in cross-section of a portion of the probe illustrating the manner in which the inner tube thereof is maintained within the outer tube of the probe.

Fig. 2 illustrates the manner in which the detector and locator apparatus of the instant invention may be used on land or in shallow water for the purpose of detecting and locating the presence of hidden metallic objects.

The detector and locator of the instant invention is divided into two parts, the back-pack 10, containing the control box, and the probe 14, insofar as the external appearance thereof is concerned. The back-pack, which contains the electronic equipment and the power supply, in one specific example thereof, is 14¼ inches high by 8 inches wide by 3⅞ inches thick and weighs 20 pounds. The controls brought out through the bottom of the back-pack are the on-off switch, the gain control, and the manual re-set switch, to be described in greater detail hereinafter. Three cables 19, 21 and 22 serve to connect the probe and head phones 18 to the apparatus contained within the back-pack, cables 19 and 21, Fig. 3 serving to connect the probe to the apparatus connected within the back-pack and carried within a rubber sheathed tube 20 and cable 22 being employed to connect the head phones 18 to the apparatus within the back-pack.

Functionally, the detector and locator may be considered as being divided into three parts, these parts including (1) the alternating field source, which includes the oscillator and radiator coil, (2) the signal detector, which includes the pickup coil and the amplifier and (3) the power supply. The structure and functions of these various components will become more readily apparent as the description proceeds.

For the reasons that the design of the radiator coil is important to the design of the oscillator and the design of the pickup and the radiator coil, respectively are very similar, the probe, coils, and oscillator will be described collectively.

The structural details of a probe which may be employed in connection with the use of the apparatus contained within the control box of the instant invention are shown in Fig. 3.

Referring now to Figs. 3 and 4, wherein the portions of the exterior and the interior of the probe 14 are respectively shown, it will be observed that the probe has a mallet-like appearance. In one specific example of a probe employed as a portion of the instant invention, it was found convenient to provide the probe with a handle 4 feet long, 2¼ inches in diameter with the cross member at one end thereof being 6¾ inches long and 3 inches in diameter. The probe weighs, in this specific example, approximately 9 lbs. The pickup coil 23 is located in the mallet head 16, and the radiator coil 25 is mounted in the probe handle 15. For the reason that the instant invention is to be used by swimmers, as hereinbefore mentioned, it will be obvious that the control box and the probe must be designed and constructed to be completely watertight.

In the specific probe coils 23 and 25, hereinbefore mentioned, ferro-magnetic cores are used for the reason that coils with such cores employed therein make for a more sensitive and more compact probe than do air core coils of the same weight. The particular core material used is 3.8%–78.5% molybdenum Permalloy, this group of alloy being used because of the high permeability thereof. For a core of given dimensions, the effect of demagnetization is such that the higher the true permeability of the material, the greater the apparent permeability and the sensitivity and the smaller the dependence of the apparent permeability on the true permeability. The dependence of the apparent permeability on the true permeability is an important consideration in the instant invention for the reason that any change of the magnetizing force, such, for example, as that produced by moving the coils about in the earth's magnetic field or a change in the alternating flux density which may be caused, for example, by a fluctuation of the plate supply voltage of the oscillator supplying power to the radiator coil will change the permeability of the core and therefore the inductance of the coil will be changed. An change in the inductance of the coil may be highly undesirable in certain applications of the instant invention such, for example, as where the coils are tuned and are part of a phase-sensitive circuit. The employment of high permeability cores greatly reduce the variation in inductance as a result of changes in the true permeability of the core material produced by movements in the earth's magnetic field or by variations in the oscillator plate supply voltage.

One of the features of the present invention which renders the apparatus employed therein capable of detecting very small signals is the orthogonal coil system which is employed and in which the plane perpendicular to and bisecting the pickup coil contains the radiator coil. By virtue of the symmetry of such a coil system, a zero coefficient of coupling exists between the radiator and pickup coils, and, therefore, no direct pickup voltage is generated by the radiator coil except a very small amount generated by reason of the fact that perfect symmetry cannot be attained by present production techniques.

It will be apparent to those skilled in the art that a zero effective coefficient of coupling between the radiator and pickup circuits may be obtained when the two coils are parallel by bucking out the direct pickup voltage by means of a voltage from an auxiliary winding on the radiator coil. Another alternative orthogonal coil system which, under certain conditions, may prove advantageous is one in which the two coils are interchanged, the radiator coil being positioned in the probe head and the pickup coil being positioned in the handle.

A further advantage of orthogonal coil systems resides in the capability thereof to provide phase-reversal of the signal as the detected object, moving in the plane containing the coil axes, crosses the axis of the probe handle thereby providing a means by which hidden objects may be located in an exceedingly accurate manner.

The probe is provided with an inner tube 26 which is supported within an outer tube 27 at the center of gravity of the pickup coil 23 and the center of gravity of the radiator coil 25 for the purpose of constraining the dynamic and static loads represented by either coil from setting up bending moments in the probe. As will be apparent from an inspection of Fig. 5, the supports are so constructed and arranged that flexure of the outer tube does not cause any bending of the inner tube, this being accomplished by supporting the inner tube 26 coaxially within the outer tube 27 upon a plurality of plastic sleeves 28 disposed about the inner tube and having an O ring 29 of any suitable material such, for example, as rubber embedded within a recess in each sleeve 28 in such a manner that the outer peripheral surface of each sleeve 28 is held in engagement with the inner surface 31 of the outer tube to thereby provide a clearance space between the inner surface of the ring and the outer surface of the inner tube. Each of the plastic sleeves is provided with a plurality of locking-pin recesses 32 which are positioned in registry with locking-pin holes 33 through which locking-pins 34 are inserted and received within the locking-pin recesses 32 to thereby lock each plastic sleeve 28 in the assembled position thereof.

Figure 6:
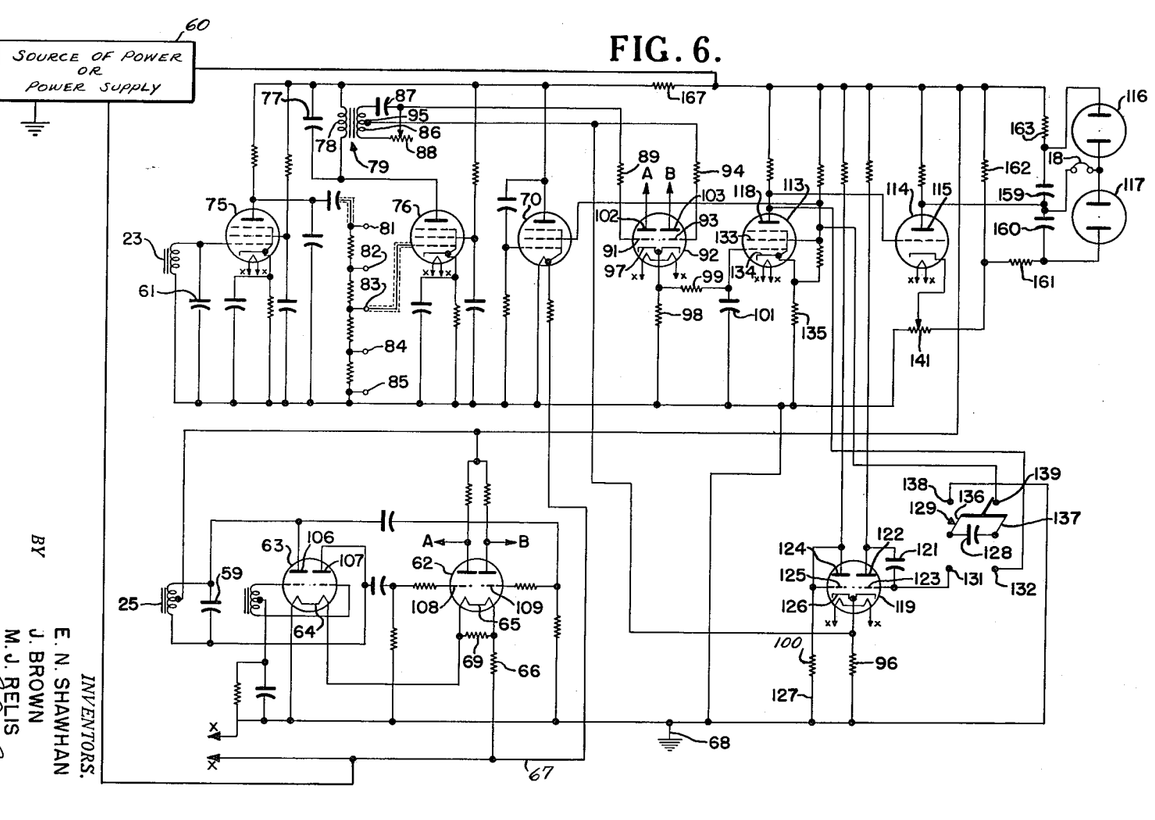
Fig. 6 illustrates a circuit, including a manual reset circuit in accordance with one form of the instant invention, whereby a signal from a hidden object may be picked up, amplified, and utilized to actuate an indicating device.
Figure 7:
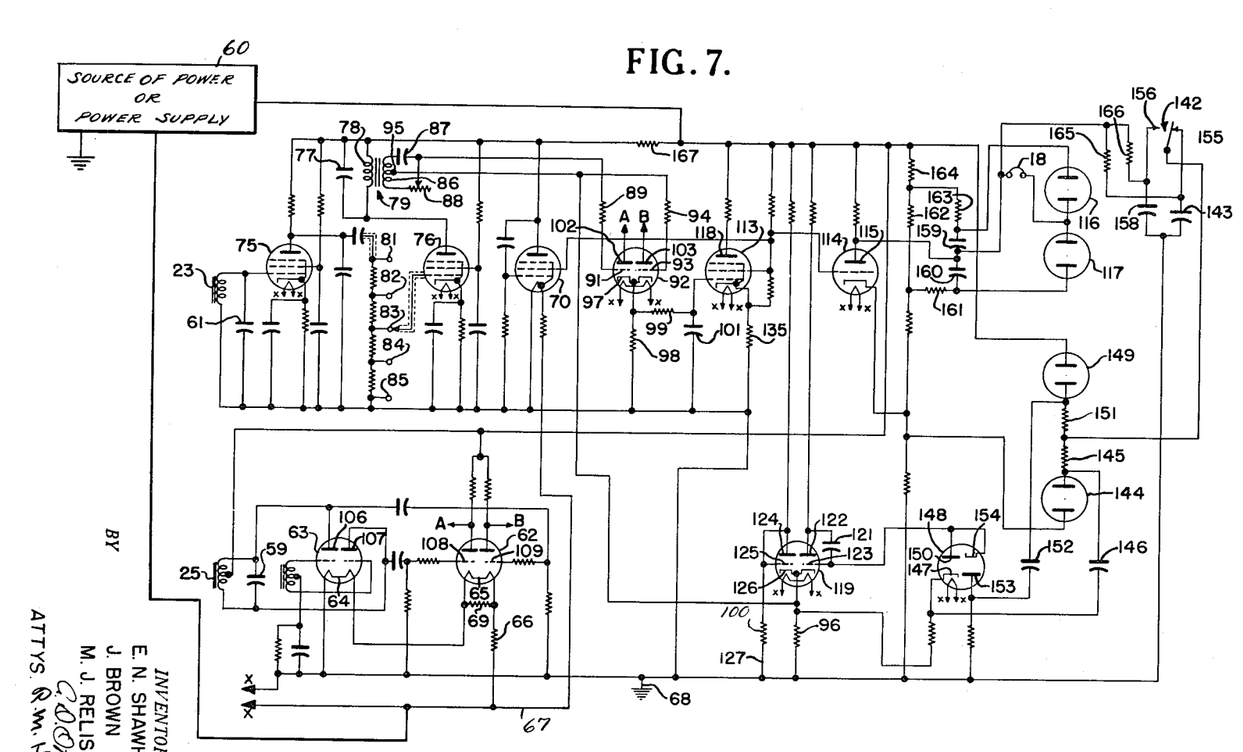
Fig. 7 illustrates a circuit arrangement, including an electronic reset circuit in accordance with another form of the present invention, whereby a signal from a hidden object may be picked up, amplified, and utilized to actuate an indicating device.

The radiator coil 25, to be described in greater detail hereinafter, is mounted within the inner tube 26 and at one end thereof. Mounted upon the outer end of the radiator coil is a terminal strip 35 which is employed for the purpose of providing connections for the cables to the amplifier and oscillator which are schematically illustrated in Figs. 6 and 7 and which will be more fully described hereinafter. The terminal strip 35 is provided with a lead-through terminal 36 to which the two conductor cable 37 is connected thereby to connect the pickup coil to the amplifier. The pickup cable 37 is passed longitudinally through the radiator coil between the core and windings thereof.

The mallet head 16 of the probe may be described as being generally cylindrical in shape and as having end caps 38 and 39. Each end cap is drawn by screws 41 into fluid-tight sealing relationship with a circular lip 42 which projects laterally and outwardly from the base portion of a rubber cup 43, this lip being disposed between one end portion of the cylindrical member 44 and the adjacent inner-surface of the end cap individual thereto. The pickup coil 23, to be described in greater detail hereinafter, is disposed within a cylindrical housing 45 which, together with the coil is seated at each end thereof within a cylindrical recess 46 provided in each of the rubber cups 43, respectively. The cylindrical housing 45 which encloses the pickup coil 23 is provided with an annular laterally and outwardly projecting collar 47. A transverse port 40 in collar 47 accommodates the cable 37 for purpose of effecting the aforementioned connection between the pickup coil and the amplifier. The collar 47 is provided with an annular recess 48 which is coaxially arranged with respect to the longitudinal axis of the collar and extends from the inner transverse face 49 thereof outwardly to a point 51 where this recess is in registry with a plurality of threaded holes 52. The innermost end 53 of the inner tube 26 is received within this recess and is secured thereto by any suitable means such, for example, as by the welding as shown at 54. The cylindrical housing 45 is provided with a plurality of countersunk holes 55 which, when housing 45 is seated within the cups 43, are in registry with the threaded holes 52. The cylindrical housing 45 is provided with a plurality of openings to thereby permit screws 56 to be threaded into holes 52 and secure collar 47 to housing 45. These screws are preferably inserted and tightened by the use of an offset screwdriver prior to the insertion of the pickup coil within the housing 45 and the closure of the ends of the cylindrical member 44 by the end caps 38 and 39. Triangular flanges 57 are secured on one side of the cylindrical member 44 and are secured thereto and to the outer tube 27 in any convenient manner such, for example, as by welding as indicated by numeral 50. The coils are mounted in the probe so that the laminations thereof lie in planes perpendicular to the plane of the probe to thereby insure orthogonality between the axes of the radiator and the pickup coil cores, respectively, producing a zero coupling effect. The inner probe tube 26 is coated with a conducting material which is grounded for the purpose of eliminating any spurious effects which may be caused by stray currents flowing through the operator's body.

The radiator coil is excited by making it the tank coil of a conventional push-pull class-C oscillator. The grid and plate windings of the radiator coil are wound on the same coil form, the plate winding not shown, being that winding nearest the longitudinal axis of the radiator coil. The grid winding 58 is wound over the plate winding, these windings being separated by a layer of fish paper, not shown. Certain advantages exist in the employment of a separate grid winding instead of grid taps. For example, the grid leads can be brought out of the coil more easily than would be possible if grid taps, several layers down in the multi-layer plate winding were used, the elimination of a coupling condenser, less phase shift of the alternating grid voltage with respect to the alternating plate voltage than when taps and coupling condensers are used, the oscillator can operate closer to the resonance frequencies of the tank circuit, and the frequency is less dependent on plate supply voltage.

The windings of the radiator coil are connected in such a manner that the grid and plate voltages of each oscillator tube, to be described more fully hereinafter, are 180° out of phase with one another and also in such a manner that the configuration of stray capacitances between the grid and plate windings or the grid and plate leads be such as to prevent the introduction of undesired oscillations. These results may be accomplished in any manner found suitable for the purpose such, for example, as by connecting the outside layers of the plate winding and the outside layers of the grid winding to the ground return.

Referring now to Figs. 6 and 7 wherein two sets of coils 23 and 25 and two values of tuning condensers are employed in the specific form of the invention hereinbefore mentioned for the purpose of utilizing different radiating frequencies and thereby providing for the simultaneous use of more than one probe in a common area. These tuning condensers are of a high quality mica type which have been temperature-cycled to produce high-temperature stability and thereby substantially prevent any variation in the phase relations in the tuned circuit as a result of changes in temperature.

The tank circuit, Figs. 6 and 7, each comprises a plurality of condensers suitable for the purpose such, for example, as two 0.25 microfarad condensers and a 0.1 microfarad condenser connected in parallel and being designated by the single numeral 59. The 0.1 microfarad condenser is employed for the purpose of tuning the detector to the lowest possible frequency to be encountered.

The pickup circuit, Figs. 6 and 7 includes a 0.025 microfarad condenser and a 0.005 microfarad condenser utilized for the lowest frequency, these condensers being connected in parallel and denoted by the numeral 61.

Capacitance must be added to the pickup circuit should it be desired to align the pickup and tank circuits with one another by reason of the coil inductances, the resonant frequency of the tank circuit being less than that of the pickup coil.

Figure 9:
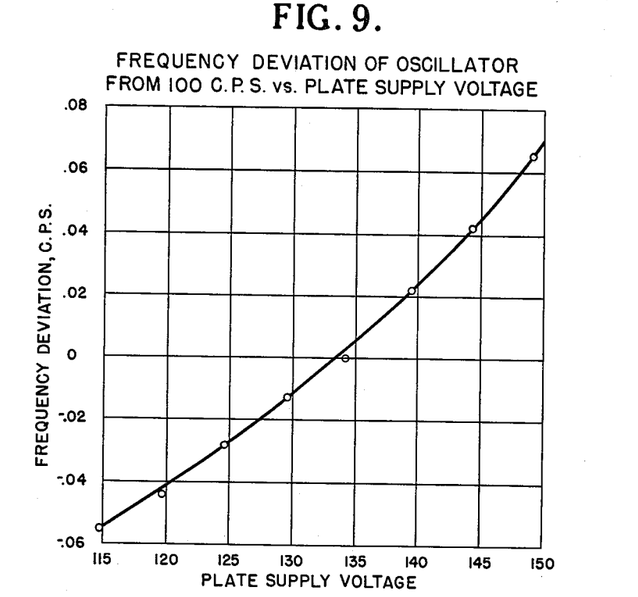
Fig. 9 is a graphical representation of the frequency deviation of the oscillator unit as used in the present invention for various plate supply voltages.

Any variation in the oscillator plate supply voltage produces a variation in the current in the radiator coil 25. Such a variation in the radiator coil current produces a change in the permeability of the core of this coil which in turn shifts the operating frequency of the oscillator. The oscillator frequency deviation is graphically represented as a function of the plate-supply voltage in Fig. 9. The stability of the oscillator frequency is of importance for the reason that the signal amplifier, described in greater detail hereinafter, is a phase sensitive circuit which is adjusted to "phase-out" surface reflection and direct pickup voltages. Any variation in the oscillator frequency alters the phase shift in the pickup circuit. A phase shift of ±5° is permissible in practice which is an oscillator frequency change of ±0.4 cycles per second for a pickup circuit having a Q of 13. Therefore, it is readily apparent that any variation in plate-supply voltage plotted in Fig. 9 will produce a suitable oscillator frequency stability. The effect of filament voltage on frequency is negligible.

The square-wave generator tube 62, Figs. 6 and 7, is driven from the plates of the oscillator 63, each half of the generator tube 62 being saturated during the positive half-cycle of the grid voltage swing thereof and cuts off during the negative half-cycle.

Figure 8:
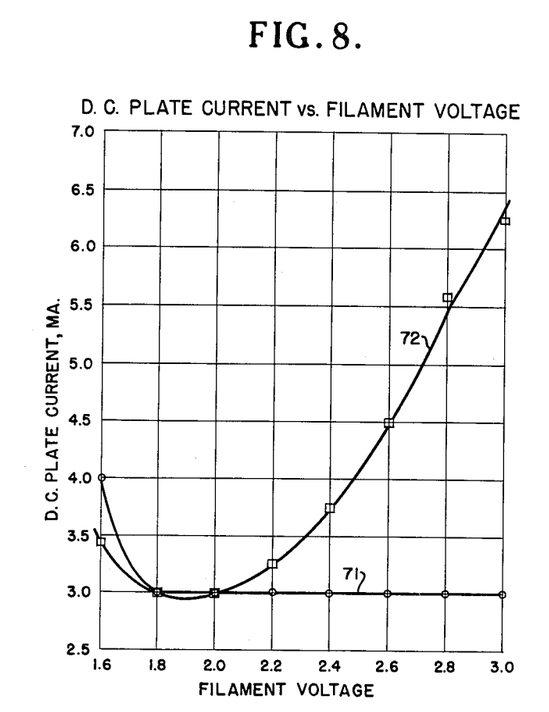
Fig. 8 is a graphical comparison of certain characteristics of two 3A5 tubes when operated separately in the oscillator unit of the present invention and in which the plate current in milliamperes is plotted as the ordinate and the filament voltage is plotted as the abscissa.
Figure 10:
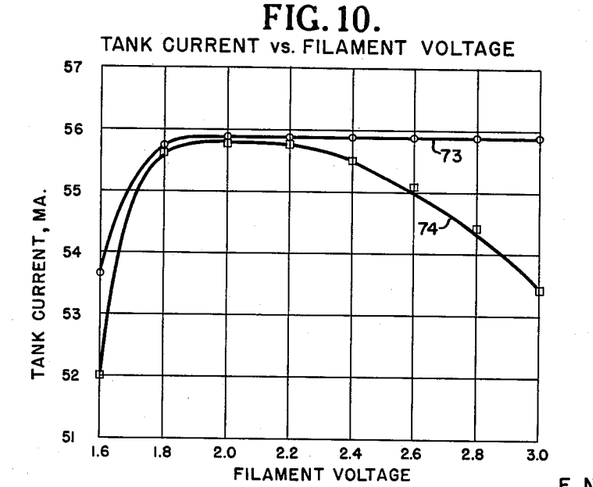
Fig. 10 is a graphical comparison of two 3A5 tubes separately operated in the oscillator unit in the instant invention and showing the effect of grid emission wherein the tank current in milliamperes is plotted as the ordinate and the filament voltage is plotted as the abscissa.

The filament 64 of the oscillator tube 63 and filament 65 of the square-wave generator tube 62 are connected in series with resistor 66 across terminal 67 and ground 68. Line 67 is connected to a terminal of a power supply unit 69 suitable for the purpose and which has a 6 volt output. Resistor 69 is connected across the filament 65 of tube 62. It is possible to eliminate resistors 66 and 69 when tubes 62 and 63 have no grid emission characteristics. However, should these tubes 62 and 63 have grid emission characteristics the employment of resistors 66 and 69 has been found to be advantageous for the reason that the filament voltages of these tubes is thereby reduced to thereby substantially reduce grid emission caused by deposits of filament-coating material on the grid which, when sufficiently heated by the filament, drives the grid bias to a less negative value. This phenomenon, as it effects oscillator performance, is graphically illustrated in Figs. 8 and 10. More specifically, Fig. 8 shows that the plate current of a tube having no grid emission characteristics, designated by curve 71, is independent of filament voltage within the desired operating range of 1.8 volts to 3.0 volts. However, in a tube which is characterized by having a grid emission under operating conditions, the effect is manifested in the behavior of the plate current of the tube which rises rapidly with increasing filament voltage, this effect being plotted as curve 72, Fig. 8. The effect of the use of grid emissive tubes upon the tank circuit of the oscillator tube 63 is shown in Fig. 10. As will be observed from an inspection of this figure, the tank current is constant when a tube having no grid emissive characteristics is employed, as is illustrated by curve 73. However, curve 74 shows that the tank current drops as the filament voltage is increased should a grid-emissive tube be utilized for this purpose.

The two forms of the amplifier which is employed in the present invention and which are respectively illustrated in Figs. 6 and 7 may be considered as comprising three main components such, for example, as an A. C. amplifier 113 embodying a phase discriminator 92, a D. C. amplifier 114 and output circuit, and a reset control. The two embodiments of the amplifier perform the same functions. However, as will readily appear as the description proceeds, these forms differ from one another in structural features and, therefore, also differ in their operational characteristics. These differences reside primarily within the reset control apparatus which will be fully described hereinafter.

Broadly, the purpose of the amplifier is to increase the voltage across the pickup coil to a level which can be satisfactorily interpreted, which voltage, as hereinbefore mentioned, may be regarded as the vector sum of three voltages when only one detector of the present invention is employed within a predetermined area. The first of these voltage vectors is the voltage picked up directly from the radiator coil 25, the second is an eddy current voltage which exists in the surrounding sea water, and the third is a voltage caused by eddy currents in a hidden metallic body. It will be clearly apparent that should another detector be operating within the aforementioned predetermined area, a fourth voltage may be picked up from the radiator coil of the adjacent detector. The primary function of the amplifier is to indicate the level of the third voltage, i. e., the voltage caused by eddy currents present in the hidden metallic body, which will be hereinafter referred to as the signal, independently of the first and second voltages as well as the fourth voltage, should such a fourth voltage be present.

Tubes 75 and 76, Figs. 6 and 7, raise the level of the voltage across pickup coil 23 to a desired gain. It is essential that distortion be at a minimum value in order that mixing of the aforementioned voltage components will be prevented in that portion of the amplifier which includes tubes 75 and 76 and the circuit constants connected thereto. The tuned circuit comprising condenser 77 and the primary winding 78 of the coupling transformer generally designated by numeral 79 is employed for the purpose of reducing harmonic level and microphonic noise. The attenuator gain terminals 81—85 are utilized for the purpose of adjusting the gain of the amplifier in any suitable increments such, for example, as increments of 0, $\frac{1}{25}$, $\frac{1}{5}$, $\frac{1}{2}$, and 1 times the full gain, respectively.

The amplifier includes a phase discriminator device which performs the three functions of rectifying of the alternating voltage, indicating one component of the change in alternating voltage level during a time interval of one minute, and providing a high degree of frequency selectivity. The phase discriminator comprises coupling transformer 79 having a center tapped secondary 86. Condenser 87 and variable resistor 88 are connected across the secondary winding 86 and are serially connected by way of resistor 89 to one grid 91 of the dual triode tube 92. The other grid 93 of tube 92 is connected by way of resistor 94 to the center tap terminal 95 of secondary winding 86. The center tap is connected through resistor 96 to ground 68. The voltage applied to grid 93 being denoted as $E_1$ in Figs. 11c and 11d, more fully described hereinafter. The cathode 97 of tube 92 is serially connected to ground by way of resistor 98 having resistor 99 and condenser 101 connected thereacross. The plates 102 and 103 of the dual triode tube 92 are driven by high amplitude square waves graphically shown as curves 104 and 105, respectively, in Figs. 11a and 11b, respectively. These square waves are nearly in phase with the alternating voltage of plates 106 and 107 of oscillator tube 63. These square waves are generated by tube 62, grids 108 and 109 of which are overdriven by voltage from the oscillator plates. The voltages at points A and B, Figs. 6 and 7, are 180° out of phase. The center-tapped secondary 86 of transformer 79 together with condenser 87 and resistor 88 are included in a circuit for shifting the phase of the alternating output voltage relative to the square wave lock-in voltage. The voltage on condenser 101 is designated as $E_{DC}$.

Figure 11A:
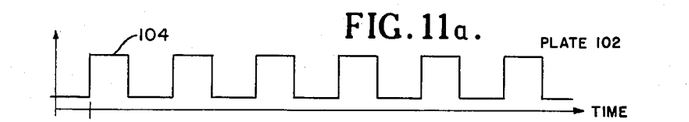
Figs. 11a–11e are graphical representations of the voltages at the various elements of the phase discriminator tube and wherein voltage is plotted as the ordinate and time is plotted as the abscissa.
Figure 11B:
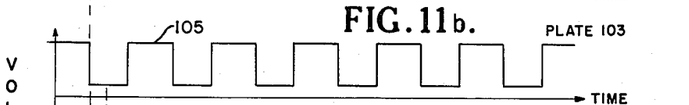
Figure 11C:
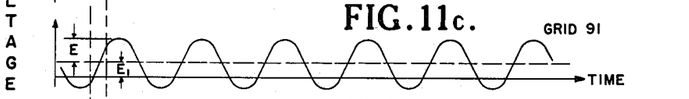
Figure 11D:
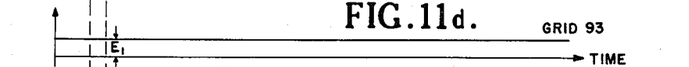
Figure 11E:
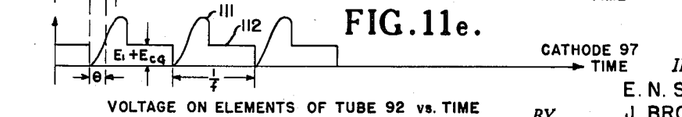

In Figs. 11a through 11e wherein the voltages on the elements of tube 92, relative to ground, are plotted against time, it will be observed that the grid 91 of tube 92 is controlled by the alternating voltage while grid 93 of this tube remains at a fixed potential $E_1$, above ground. In addition, it will be apparent that as the potential on plates 102 and 103 of tube 92 is increased and decreased in accordance with variations in the voltage as represented by the square waves, the common cathode 97 of tube 92 alternately follows first one grid and then the other. Further, as seen in these figures, the alternating voltage leads the lock-in square wave voltage by an angle $\theta$. The cathode voltage ripple 111 in Fig. 11e is characterized as having a constant voltage component 112. This cathode ripple is filtered by resistor 99 and condenser 101, and the constant voltage appearing across this condenser is equal to the average area under the cathode potential curve, Fig. 11e when the potential difference between the voltage on grid and cathode of tube 92 is equal to $E_{CG}$ and an alternating voltage having a frequency $f$ and amplitude E is applied to grid 91 of the tube. Expressed mathematically, the constant voltage appearing across condenser 101 is $$E_{DC}=\frac{1}{\frac{1}{f}}\left[\int_{t=\frac{-\theta}{2\pi f}}^{t=\frac{\pi-\theta}{2\pi f}} E \sin 2\pi f dt + \frac{1}{f}(E_1+E_{CG})\right]$$

$$=\frac{E}{\pi}\cos\theta + E_1 + E_{CG}$$

where $$E=E_R+E_S+E_{\text{signal}}+E_L$$

wherein E is the voltage induced in the pickup coil 23 which is the vector sum of:

$E_R$ The direct pickup voltage from the radiator coil $E_S$ The voltage due to eddy currents in the sea water $E_{\text{signal}}$ The voltage due to eddy currents in the hidden object $E_L$ The voltage due to another locator which may be operating in the vicinity $E_1$ The fixed potential applied to grid 93 of tube 92

$E_{CG}$ The potential difference between the grid and cathode of tube 92

Each component of the voltage appearing across condenser 101 may be considered individually for the reason that this voltage is the vector sum of three unmixed voltages of the same frequency, as hereinbefore mentioned.

The effect of the direct pickup from the radiator coil on the voltage appearing across condenser 101 may be eliminated by adjusting the magnitude of the fixed potential $E_1$ on grid 93 of tube 92 by varying the setting of resistor 88. This fixed potential is readjusted at time intervals of approximately one minute for the reason that the direct pickup voltage from the radiator coil 25 decreases in value as the orientation of the coils is altered by thermal changes.

The voltage induced in the pickup coil by eddy currents present in sea water is substantially in quadrature with the radiator coil current and is substantially constant when the coils are less than ten feet from the surface of the water. The discontinuity of the bed of the body of water in which the detector and locator is employed produces substantially no effect upon the voltage induced in the pickup coil. Therefore, the phase shift of this voltage component may be controlled by adjusting resistor 88 in such a manner that this voltage arrives at the discriminator substantially 90° out of phase with the lock-in voltage. Consequently, this voltage contributes substantially nothing to the constant voltage appearing across condenser 101 as is apparent from the relation $$E_{\text{D. C. OUPUT}}=KE_{\text{A. C. INPUT}} \cos\theta$$

where K is a constant depending on the circuit.

When resistor 88 is set for a minimum change in the voltage across condenser 101, the signal and the direct pickup voltage are shifted in phase, should the coils pass through the surface of the water. The phase angle $\theta$ for most brass or aluminum objects approximately the size of a Japanese JG or JE mine is approximately 45° or 135° and the change in the constant voltage across condenser 101 is approximately 70% of the optimum. Tests, using various known conducting and magnetic objects, were made with equipment as herein described and the phase angle determined permitting calibration of similar equipments in terms of phase angles which corresponded to these various known conducting and magnetic objects.

The voltage developed in response to the detection of the signal from the radiator coil of an adjacent detector and locator device is at a frequency different from that of the lock-in voltages as shown on Figs. 11a and 11b by curves 104 and 105 and is attenuated by the tuned circuits in the alternating voltage portion of the amplifier. As a result of the difference between the frequencies of the lock-in voltages and the voltage contributed by the operation of an adjacent detector and locator device, a different part of the wave appears across the cathode 97 of tube 92 on successive cycles, thereby producing a beat at the difference of their frequencies which is filtered to a low level by resistor 99 and capacitor 101.

From an inspection of Figs. 6 and 7 it will become readily apparent that grid currents flow in tube 92, should the amplitude of the alternating voltage be sufficiently high and of the correct phase. More specifically grid current flows in tube 92 when the grid 91 therein is driven far enough positive while grid 93 controls the cathode potential, and also flows when grid 91 is driven far enough negative while it controls the cathode. The grid currents flow through resistance 98 and contribute to the voltage thereacross. Therefore, resistors 89 and 94 serially connected with grids 91 and 93, respectively, limit these currents to small values.

The direct current amplifier and the output circuit of that portion of the device illustrated in Figs. 6 and 7 will now be described in detail. The discriminator, hereinbefore described, operates at a low alternating voltage level in order that mixing of background and signal voltages will be prevented. Consequently, tube 113 must provide a considerable constant voltage gain such, for example, as 125. The driving power to produce a tone in the earphones 18 is provided by tube 114 which produces any desired predetermined gain in voltage such, for example, as 5 to 7.

The constant voltage produced by the signal may be of either polarity. Voltages of successively opposite phase are induced in the pickup coil 23 as a hidden metallic object is moved across the plane containing the radiator coil 25 and perpendicular to the axis of the pickup coil 23 for the reason that these coils are mutually perpendicular. It is possible to distinguish between ferrous and non-ferrous bodies, the ferrous bodies inducing voltages in the pickup coil of considerably different phase than those induced by non-ferrous bodies on the same side of the null plane. Ferrous and non-ferrous bodies on the same side of the null plane produce voltages across condenser 101 of opposite polarity when the phase setting is such as to exclude noise from sea-water eddy currents. Therefore, both the direction from the detector and the nature of the hidden object is known after the coils have been rotated to change the voltage across condenser 101 through the no-signal level. After the direction and nature of the object have been determined the probe is pointed toward the object by swinging the probe to a position in which the phase of the signal is about to reverse and the sense or polarity of the phase distinguishes between ferrous and non-ferrous metals.

The voltage on grid 91 of tube 92 is adjusted in the absence of a signal so that the plate 115 of tube 114 is brought midway between the points where one of the neon tubes 116 or 117 is fired. Simultaneously therewith, a signal having a phase which increases the voltage across condenser 101, renders the plate 118 of tube 113 more negative than previously and the plate 115 of tube 114 more positive. Neon tube 117 is then fired and oscillates to thereby produce a high pitched tone in the earphones 18 until the signal ceases to be picked up. A signal having a phase which decreases the potential across condenser 101 forces the plate 115 of tube 114 down in potential, causes tube 116 to be fired, and produces a low-pitched tone in phones 18 so long as the signal is picked up. For this reason, the tone heard by the operator changes abruptly in pitch as the coils are moved past the null plane over the object to be detected and located.

The circuits disclosed in Figs. 6 and 7 differ only in the manner in which the voltage on grid 91 of tube 92 is controlled to cause the effect of the direct pickup voltage to the potential across capacitor 101 to be cancelled, this control being designated as the reset control. The reset control apparatus will now be described. The arrangement of the reactance tube 119 in the two circuits is identical. This tube functions as a condenser in such a manner as to increase the effective capacitance of the combination of the condenser 121 and tube 119 to any capacitance suitable for the purpose such, for example, as 35 mfd., and controls the grid 93 of the cathode follower tube 92, and develops the voltage on grid 93 of tube 92. The condenser 121 is connected across the plate 122 and grid 123 of tube 119. The purpose of the cathode follower comprising tube 119 is to isolate the control condenser 121 from the leakage and grid currents in the discriminator circuit. By such an arrangement as that shown, the capacitance of condenser 121 is increased by the gain of tube 119.

The other triode of tube 119, comprising plate 124, grid 125 and cathode 126 is connected to increase the gain of the tube when the cathode 126 is driven negative and the plate 124 becomes more positive to thereby tend to prevent the rate of leakage across condenser 121 from increasing as the voltage thereacross is raised. To this end the plate 124 and grid 125 of tube 119 are respectively connected by way of conductor 127 which includes resistance 100 therein to ground 68.

In the circuit disclosed in Fig. 6, condenser 121 is charged to the correct potential from condenser 128 which is connected to or disconnected from, as the case may be, the grid 123 of tube 119 and the condenser 121 upon actuation of the switch generally designated by numeral 129. At a predetermined point of operation, the plate 118 of tube 113 is approximately 30 volts above ground potential and condenser 128 is charged to approximately the same potential above ground. As will be apparent from an inspection of Fig. 6, when switch 129 completes the circuit between terminals 131 and 132 to thereby connect one side of the condenser 128 to the plate 118 of tube 113 and the other side of condenser 128 to the grid 123 of tube 119 and to condenser 121, a charge transfer is effected to bring the plate of tube 113 to the equilibrium potential of approximately 30 volts, for example. Condenser 121 with the gain of one-half of tube 119 is the equivalent of a large capacitance being connected between the grid 123 of tube 119 and ground. In that form of the invention disclosed in Fig. 6, any change in the potential of grid 123 of tube 119 is transmitted through two cathode followers to the control grid 133 of tube 113. The first of these cathode followers comprises the cathode 97 of tube 92 and resistance 98, and the second of these cathode followers includes the cathde 134 of tube 113 and resistance 135.

In the circuit of Fig. 6, condenser 128 is first charged to the potential of the plate 118 of tube 113 by actuating switch 129 so that the poles 136 and 137 thereof engage switch terminals 138 and 139, respectively. Should the absolute value of the potential at plate 118 be greater than the difference in absolute values of the voltage across tube 119 and the voltage between grid 123 and cathode 126 of this tube, the voltage across the tube 119 rises in potential and the potential between the grid 123 and cathode 126 of the tube as well as the potential across condenser 128 decreases until equilibrium is established when the switch 129 is actuated to effect engagement between the poles 136 and 137 thereof and the switch terminals 138 and 139, respectively. Should the absolute value of the potential at plate 118 be less than the aforementioned potential difference, the potential across tube 119 decreases, the potential between grid 123 and cathode 126 of tube 119 increases, and the potential across condenser 128 increases when switch 129 is actuated to the second mentioned position thereof.

Condenser 128 is alternately charged and discharged by the actuation of switch 129 until the aforementioned difference in potentials is nearly equal to the potential at plate 118.

After the plate 118 of tube 113 has been adjusted to a potential that does not change on repeated actuations of the reset switch 129, the cathode potential of tube 114 is adjusted by setting resistance 141 until the potential on plate 115 of tube 114 has been adjusted to a value midway between the potentials which will fire tube 116 or 117.

That form of the invention illustrated in Fig. 7 discloses an alternate arrangement for charging condenser 121 to a potential which cancels the effect of the direct pickup voltage to the potential across condenser 101. This arrangement may be characterized as having certain advantages not present in the form of the instant invention disclosed in Fig. 6 such, for example, as the elimination of a switch which must be repeatedly actuated and the ability to correct the potential across condenser 121 more rapidly than is possible in that form of the invention disclosed in Fig. 6. The reset rate of the device of Fig. 7 may be increased by depressing the push switch 142 which, when in the position shown, permits condenser 143 to become charged from plate 115 of tube 114 with a long time constant. Should the potential across this condenser rise to a sufficiently high level, the tube 144 will be fired to thereby discharge this condenser and produce a voltage pulse across resistance 145, through condenser 146 to thereby drive cathode 147 of tube 148 negative to a sufficient extent to draw the charge of condenser 121 through the diode comprising plate 150 and cathode 147 of this tube. Similarly, should condenser 143 drop in potential to a sufficient extent, tube 149 will be fired and charge will flow into condenser 121 from resistor 151, condenser 152, plate 153 and cathode 154 of tube 148.

When the push switch 142 is depressed to thereby move the switch arm 155 thereof into engagement with switch contact 156 and away from engagement with switch contact 157, condenser 158 replaces condenser 143 and pulses of charge are supplied to or drawn from condenser 121, as the case may be, at a more rapid rate than when using condenser 143 until this condenser reaches a potential that prevents either of the tubes 144 or 149 from firing. In Fig. 7 the rate of charging condensers 143 and 158 is determined by resistors 165 and 166, respectively.

Tubes 144 and 149 are biased so that they will fire before either tube 116 or tube 117 which latter tubes are activated through condensers 159 and 160, respectively, from the plate 115 of tube 114. In Fig. 6 the constant potential applied to neon tube 116 is reduced through resistor 163 and to tube 117 through resistors 161 and 162. In Fig. 7 the potential applied to tube 117 is reduced through resistors 161, 162 and 164 and the potential applied to tube 116 is reduced through resistors 163 and 164. Either tube 144 or tube 149 will fire when a signal is received, thereby producing a small reduction in the over-all sensitivity of the system.

The voltage required for the operation of the present invention is supplied by a vibrator type power unit of any conventional design suitable for the purpose. Tube 70 is provided to insure a regulated voltage supply to the alternating current stages of the amplifier and is essentially a large condenser similar to condenser 121 and tube 119 to which current is supplied by way of dropping resistance 167. The curent required for the back-pack and probe of the specific examples therein disclosed being 0.96 ampere at 6 volts for the filaments of the various tubes, 0.18 milliampere at 6 volts for the reset motor, and 15 milliamperes at 140 volts for the vibrator B-voltage.

While the invention has been described herein with reference to two examples thereof which give satisfactory results, it will be understood by those skilled in the art to which the invention pertains, after understanding the invention, that various changes and modifications may be made without departing from the spirit and scope of the invention, and it is our intention, therefore, to cover in the appended claims all such changes and modifications.

The invention herein described and claimed may be manufactured and used by or for the Government of the United States of America for governmental purposes without payment of any royalties thereon or therefor.

What is claimed as new and desired to be secured by Letters Patent of the United States is:

1. An electronic detecting and locating apparatus for indicating the presence and location of conducting and magnetic materials comprising, in combination, means for producing a local sinusoidal magnetic field, means for detecting the disturbance of said locally produced field by hidden conducting and magnetic materials, a square wave generator, said square wave generator producing voltages 180° out of phase and connected to said local sinusoidal magnetic field producing means, a phase discriminator connected to said square wave generator for determining the phase shift between the voltage produced by the disturbance of said locally produced field and said square wave voltage, a reset control for cancelling the effect of the direct pickup of said local magnetic field by said detecting means, means connected to said phase discriminator for signalling the presence of said hidden conducting and magnetic materials, and a source of power for energizing said detecting and locating apparatus.

2. An electronic conducting and magnetic material detector and locator apparatus comprising, in combination, a probe having orthogonally arranged radiator and detector coils therein, an oscillator connected to said radiator coil, an amplifier connected to said detector coil, a square wave generator producing voltages 180° out of phase, said oscillator controlling said square wave generator, a phase discriminator connected to said amplifier and said square wave generator, a reset control for cancelling the effect of the direct pickup of said radiator coil by said detector coil, a power supply for energizing said apparatus, and an indicating means connected to said discriminator for signalling the presence and location of a hidden metallic body.

3. An electronic conducting and magnetic materials detector and locator apparatus as in claim 2 wherein said probe comprises a first tubular member, a second tubular member of shorter length than said first member and normally, rigidly secured to the first member, said radiator coil carried within said first tubular member and said detector coil carried within said second tubular member.

4. An electronic detector and locator apparatus comprising, in combination, a probe having radiator and detector coils arranged therein, said radiator coil axis being in a plane perpendicular to and bisecting said detector coil axis, an oscillator connected to said radiator coil for producing a local magnetic field, an amplifier connected to said detector coil for amplifying the detected voltage produced by the disturbance of the locally produced field by hidden conducting and magnetic materials, a square wave generator producing voltages 180° out of phase, said oscillator controlling said square wave generator, a phase discriminator connected to said square wave generator and said amplifier for determining the phase difference between the detected voltage due to the disturbance of the locally produced magnetic field by hidden conducting and magnetic materials and the square wave voltage, amplifying means connected to said phase discriminator, a reset control for cancelling the effect of the direct pickup of said radiator coil by said detector coil, signalling means connected to said amplifying means to indicate the presence and location of said hidden materials, a source of power for energizing said detecting and locating apparatus.

5. An electronic conducting and magnetic materials detector and locator apparatus as in claim 3 wherein said probe is further provided with a third tubular member arranged concentrically within said first tubular member and carrying said radiator coil, said third tubular member being supported for rotation relative to said first and second tubular members.

6. An electronic and conducting materials detector and locator apparatus as in claim 5 wherein said third tubular member is supported within said first tubular member at a first point corresponding to the center of gravity of said detector coil and at a second point corresponding approximately to the center of gravity of the radiator coil, said supporting means permitting relative rotation of said third tubular member relative to said first tubular member.

7. An electronic detecting and locating apparatus for indicating the presence and location of conducting and magnetic materials, comprising, in combination, oscillator means for producing a local sinusoidal magnetic field, means responsive to disturbances of said locally produced field by hidden conducting and magnetic materials, said means including a two-stage alternating current amplifier wherein said first and second stages thereof are coupled by means comprising a tapped resistance, a dual triode phase discriminator, the second stage of said amplifier being connected to said discriminator through an adjustable impedance, a square wave voltage generator producing voltages 180° out of phase, said square wave generator being connected to said oscillator and said dual triode phase discriminator, said adjustable impedance permitting phase adjustment between the detected voltage produced by said disturbance of the locally produced magnetic field applied to the grids of the dual triode phase discriminator and the square wave voltage applied to the plates of said dual triode phase discriminator, a reset control for cancelling the effect of the direct pickup of said local magnetic field by said detecting means, a direct current amplifier connected to said phase discriminator, signalling means connected to said direct current amplifier to indicate the presence and location of hidden conducting and magnetic materials, a power source for energizing said apparatus.

8. An apparatus as set forth in claim 7 wherein said power source includes voltage regulating means.

9. An apparatus as set forth in claim 7 wherein said adjustable impedance comprises a coupling transformer having a tuned primary circuit including a capacitor for reducing harmonics resulting from a combination of voltages induced in said detector coil, and a tapped secondary serially connected to a capacitance and resistance for effecting a phase shift between the detected voltage due to hidden conducting and magnetic materials and said square wave voltage applied to said phase discriminator.

10. An electronic detecting and locating apparatus for indicating the presence and location of conducting and magnetic materials, comprising, in combination, mean for producing a local sinusoidal magnetic field, means for detecting and amplifying the disturbance of said locally produced field by hidden conducting and magnetic materials, a square wave generator producing voltages 180° out of phase, said square wave generator connected to and controlled by said local sinusoidal magnetic field producing means, a phase discriminator connected to said square wave generator for determining the phase shift between the voltage produced by the disturbance of said locally produced field and said square wave voltage, said amplifying means being coupled by a phase shifting impedance to said phase discriminator, a direct current amplifier, said discriminator connected to an RC filter circuit, said RC filter circuit being connected to said direct current amplifier, means for selectively applying only a desired signal voltage appearing across said RC filter circuit to said direct current amplifier, a reset control for cancelling the effect of the direct pickup of said local magnetic field by said detecting means, signalling means connected to said direct current amplifier to indicate the presence and location of hidden conducting and magnetic materials, a source of power for energizing said apparatus.

11. An electronic detecting and locating apparatus for indicating the presence and location of conducting and magnetic materials comprising, in combination, a probe having orthogonally arranged radiator and detector coils therein, an oscillator connected to said radiator coil for producing a local magnetic field, an alternating current amplifier connected to said detector coil, a square wave generator producing voltages 180° out of phase connected to and controlled by said oscillator, a phase discriminator connected to said alternating current amplifier through a phase shifting impedance for determining the phase shift between the voltage produced by the disturbance of said locally produced magnetic field by hidden conducting and magnetic materials and said square wave voltage, an RC filter circuit connected across the cathode of said phase discriminator, a direct current amplifier connected to said RC filter circuit and controlled by potentials appearing across the capacitor of said RC circuit, means for selectively applying only a desired signal voltage appearing across said RC filter circuit to said direct current amplifier, a reset control connected to said phase discriminator and effective to cancel the effect of the induced voltage produced by said radiator coil across said detector coil and appearing across said RC filter circuit said reset control comprising a capacitor connected to an electronic device capable of increasing the effective capacitance of said capacitor and control means for charging and discharging said capacitor, signalling means connected to said direct current amplifier for indicating the presence and location of hidden magnetic and conducting materials, a power source for energizing said apparatus and electronic means for regulating said power source.

12. Apparatus as set forth in claim 11 wherein said signalling means comprises a sonic indicaor responsive to high and low pitch tones, first and second electron discharge devices capacitatively connected to said direct current amplifier and said sonic indicator, said electron discharge devices being activated selectively depending upon the magnitude of the signals produced by disturbance of said magnetic field by hidden conducting and magnetic materials, the magnitude of said signal depending upon the phase shift between the voltage produced by the disturbance of said locally produced field and said square wave voltage, increases in said signal applied to said direct current amplifier effective to cause said first electron discharge device to oscillate and produce a high pitch tone in said sonic indicator and decreases in said signal applied to said direct current amplifier effective to cause said second electron discharge device to oscialte and produce a low pitch tone in said sonic indicator whereby location and composition of said hidden conducting and magnetic materials may be determined depending upon the pitch and sequence of the change in tone with respect to a null plane passing through the axis of said radiator coil and perpendicular to said pick up coil axis as said null plane passes over the hidden material.

13. Apparatus as set forth in claim 11 wherein said reset control capacitor charging and discharging is manually controlled.

14. Apparatus as set forth in claim 11 wherein said reset control capacitor charging and discharging is electronically controlled.

15. Apparatus as set forth in claim 13 wherein said manually operated charging and discharging control includes a capacitor for energizing and deenergizing said reset control capacitor upon operation of said manual control until a state of charge equilibrium between said reset control capacitor and said charging control capacitor is obtained.

16. Apparatus as set forth in claim 14 wherein said electronically operated charging and discharging control includes a dual diode space discharge device, each diode section thereof being serially connected to capacitors controlling the operation of said dual diode device to permit charging and discharging of said reset control capacitor through said dual diode in response to signals of predetermined character, electron discharge devices connected to said direct current amplifier output through an electronic timing circuit controlling the operation of said electron discharge devices in response to signals of predetermined character thereby selectively charging and discharging said reset control capacitor.

17. Apparatus as set forth in claim 16 wherein said electronic charging and discharging timing control is adjustable and comprises a plurality of serially connected capacitor and resistor combinations and means for selecting a particular combination to control the time of charging and discharging said reset control capacitor.

References Cited in the file of this patent

UNITED STATES PATENTS

| | | |
|---|---|---|
| 2,129,058 | Hedden | Sept. 6, 1938 |
| 2,489,920 | Michel | Nov. 29, 1949 |